(12) United States Patent
Mundt et al.

(10) Patent No.: US 6,563,673 B2
(45) Date of Patent: May 13, 2003

(54) METHOD AND APPARATUS FOR MINIMIZING SLIDER FLY HEIGHTS OVER PATTERNED MEDIA

(75) Inventors: Michael D. Mundt, Longmont, CO (US); Mark A. Chapin, Boulder, CO (US); Gary E. Bement, Frederick, CO (US); Brian D. Denker, Rogers, CO (US); Paul M. Jones, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/952,122

(22) Filed: Sep. 11, 2001

(65) Prior Publication Data

US 2002/0051315 A1 May 2, 2002

Related U.S. Application Data

(60) Provisional application No. 60/232,034, filed on Sep. 12, 2000, and provisional application No. 60/243,241, filed on Oct. 25, 2000.

(51) Int. Cl.[7] .............................. G11B 5/82; G11B 5/84; G11B 5/596
(52) U.S. Cl. .................. 360/135; 360/77.05; 360/77.08
(58) Field of Search ............................... 360/135, 234.3, 360/133, 77.05, 77.08

(56) References Cited

U.S. PATENT DOCUMENTS

| | | | |
|---|---|---|---|
| 5,381,287 A | * | 1/1995 | Kawazoe et al. .......... 360/234.3 |
| 5,504,639 A | * | 4/1996 | Kawazoe ................... 360/234.3 |
| 5,504,646 A | * | 4/1996 | Tanaka et al. ............... 360/133 |
| 5,590,009 A | | 12/1996 | Ishida ......................... 361/135 |
| 5,748,421 A | * | 5/1998 | Taki et al. ................... 360/135 |
| 5,815,333 A | | 9/1998 | Yamamoto et al. ........... 360/60 |
| 5,828,536 A | | 10/1998 | Morita ........................ 360/135 |
| 5,875,083 A | * | 2/1999 | Oniki et al. ................. 360/135 |
| 5,999,360 A | | 12/1999 | Meyer et al. ............. 360/77.02 |
| 6,051,299 A | | 4/2000 | Uchiyama et al. ......... 428/65.3 |
| 6,088,200 A | | 7/2000 | Morita ........................ 360/135 |
| 6,104,579 A | * | 8/2000 | Kamoshita et al. ......... 360/135 |
| 6,183,892 B1 | | 2/2001 | Saiki et al. ............. 428/694 ST |

FOREIGN PATENT DOCUMENTS

| | | | |
|---|---|---|---|
| JP | 5-81808 | * | 4/1993 |
| JP | 6-267047 | * | 9/1994 |
| JP | 07065363 | | 3/1995 |
| JP | 7-153069 | * | 6/1995 |
| JP | 10-40540 | * | 2/1998 |
| JP | 10-40541 | * | 2/1998 |
| JP | 10-49803 | * | 2/1998 |
| JP | 2000-20945 | * | 1/2000 |

* cited by examiner

*Primary Examiner*—William Klimowicz
(74) *Attorney, Agent, or Firm*—Westman, Champlin & Kelly, P.A.

(57) ABSTRACT

A patterned magnetic storage medium has a plurality of data sectors separated by respective servo sectors with each servo sector having a pattern of pits representing servo data. Grooves in each data sector separate adjacent tracks. Non-uniform structures patterns the grooves to a model of minimum or zero fly height perturbations of a slider adjacent the medium. The non-uniform structures preferably include lands pseudo-randomly spaced along each groove to form segmented grooves of pseudo-random length, with the lands being pseudo-randomly positioned across the data sector. In other embodiments, the servo sectors have lengths along each track to define a null frequency that matches a pitch frequency of modulation of a slider due to the pits of the servo sectors.

19 Claims, 7 Drawing Sheets

METHOD AND APPARATUS FOR MINIMIZING SLIDER FLY HEIGHTS OVER PATTERNED MEDIA

CROSS-REFERENCE TO RELATED APPLICATION

This application claims benefit of Provisional Application No. 60/232,034, filed Sep. 12, 2000 and of Provisional Application No. 60/243,241, filed Oct. 25, 2000.

FIELD OF THE INVENTION

This invention relates to disc storage apparatus employing patterned storage media, and particularly to patterned media for use in disc drives having aerodynamic transducers with minimal fly heights.

BACKGROUND OF THE INVENTION

Patterned media of magnetic disc drives employ magnetic recording discs having a predetermined pattern of surface irregularities in the form of depressions, such as pits or grooves, and/or raised areas, such as bumps and lands, that define a servo pattern within servo sectors. The user data are magnetically recorded on the medium and read from the medium through magnetic recovery techniques. The servo pattern is permanently formed in the medium as surface irregularities. The pattern of surface irregularities is read from the medium using thermal or optical techniques.

Patterned disc media are commonly employed in magnetic disc drives having aerodynamically flying transducers comprising a slider and a read/write head. The slider includes an air bearing surface that "flies" the head adjacent the rotating disc. In one form, magnetoresistive read heads transfer heat generated by the sense current to the medium to dissipate within the medium. When confronting the surface irregularities of the servo pattern, changes in distance between the flying transducer and each depression or raised area changes the heat transfer characteristics between the transducer and the medium, thereby altering the resistance of the magnetoresistive head. Consequently, the resistance of the head changes with the servo pattern manifest in the surface irregularities, and the servo pattern can be electronically recovered from the voltage across the head. Patterned media are also used in environments where the user data are recorded and recovered magnetically while the servo data are recorded and recovered optically, similar to techniques used in optical disc drives.

One problem of patterned discs is that the pattern of surface irregularities causes fly height perturbations of the flying head, creating a modulating fly height of the head over the disc. Typically, the depth of the depressions or height of the raised areas forming the servo patterns on a patterned medium is about 10 to 25 nanometers. The surface irregularities are usually so tightly packed and numerous that the slider passing over the servo sector aerodynamically "sees" one large depression or one large raised area having a length along the track equal to the length of the servo pattern, such as about 20 to 80 microns and an apparent depth or height about one-half the depth or height of the pits or bumps. Consequently, the slider aerodynamically sees a "valley" or "hill" in the servo sector that is 5 to 12.5 nanometers deep or high, 20 to 80 microns long, and as wide as the slider. As the slider passes over this "valley" or "hill" formed by the servo sector, fly height perturbations as large as 5 to 10 nanometers may occur.

As the trend toward increasing disc track density continues, there is a corresponding need to minimize the fly height of the head. More particularly, nominal fly heights of 10 nanometers or less is required for some high track density drives. Since it is normally necessary to maintain fly height perturbations at no more than 10% of the nominal fly height, perturbations of less than ±1 nanometer are required for high track density drives. The present invention provides a solution to this and other problems, and offers other advantages over the prior art.

SUMMARY OF THE INVENTION

In one embodiment of the invention, a patterned magnetic storage medium has a plurality of data sectors separated by respective servo sectors and a plurality of parallel tracks extending through the servo sectors and data sectors. Each servo sector has a pattern of first surface irregularities, such as pits or lands, representing servo data. A second surface irregularity, such as a groove or ridge, in each data sector separates adjacent tracks, with each first and second surface irregularity having an elevation, such as a depth or height, different from a nominal surface of the medium. Non-uniform means are so disposed and arranged that a slider adjacent the medium is modeled with minimum fly height perturbations when the slider is moved at a selected velocity along the tracks.

In preferred forms, the non-uniform means includes third surface irregularities, such as lands or pits, in the second surface irregularities that are pseudo-randomly spaced along each second surface irregularity to form segments of pseudo-random length and are pseudo-randomly positioned across the data sector.

In another embodiment, the storage medium is arranged to move at a predetermined velocity relative to a slider to cause the slider to fly along a track over the data sectors and servo sectors. The servo sectors have a length along each track that defines a null frequency that matches a pitch frequency of modulation of the slider due to the first surface irregularities of the servo sectors.

In another embodiment, a patterned storage medium is fabricated by forming surface irregularities, such as pits or lands, to an elevation, such as a depth or height, different from a nominal surface of the medium to define servo sectors separating data sectors on the medium. A plurality of tracks are defined through data sectors and servo sectors. A plurality of second surface irregularities, such as grooves or ridges, are formed parallel to each track through the data sectors, and a plurality of third surface irregularities, such as lands or pits, are formed in the grooves or ridges to segment the grooves or ridges. The third surface irregularities are arranged so that when the medium is moved at a selected velocity along the tracks, a slider adjacent the medium is modeled with minimum fly height perturbations when the slider is moved at a selected velocity along the tracks.

In another embodiment, the length of each servo sector along each track is defined to minimize modulation of an aerodynamic slider arranged to fly adjacent the medium.

Other features and benefits that characterize the present invention will be apparent upon reading the following detailed description and review of the associated drawings.

DETAILED DESCRIPTION OF ILLUSTRATIVE EMBODIMENTS

Figure 1:
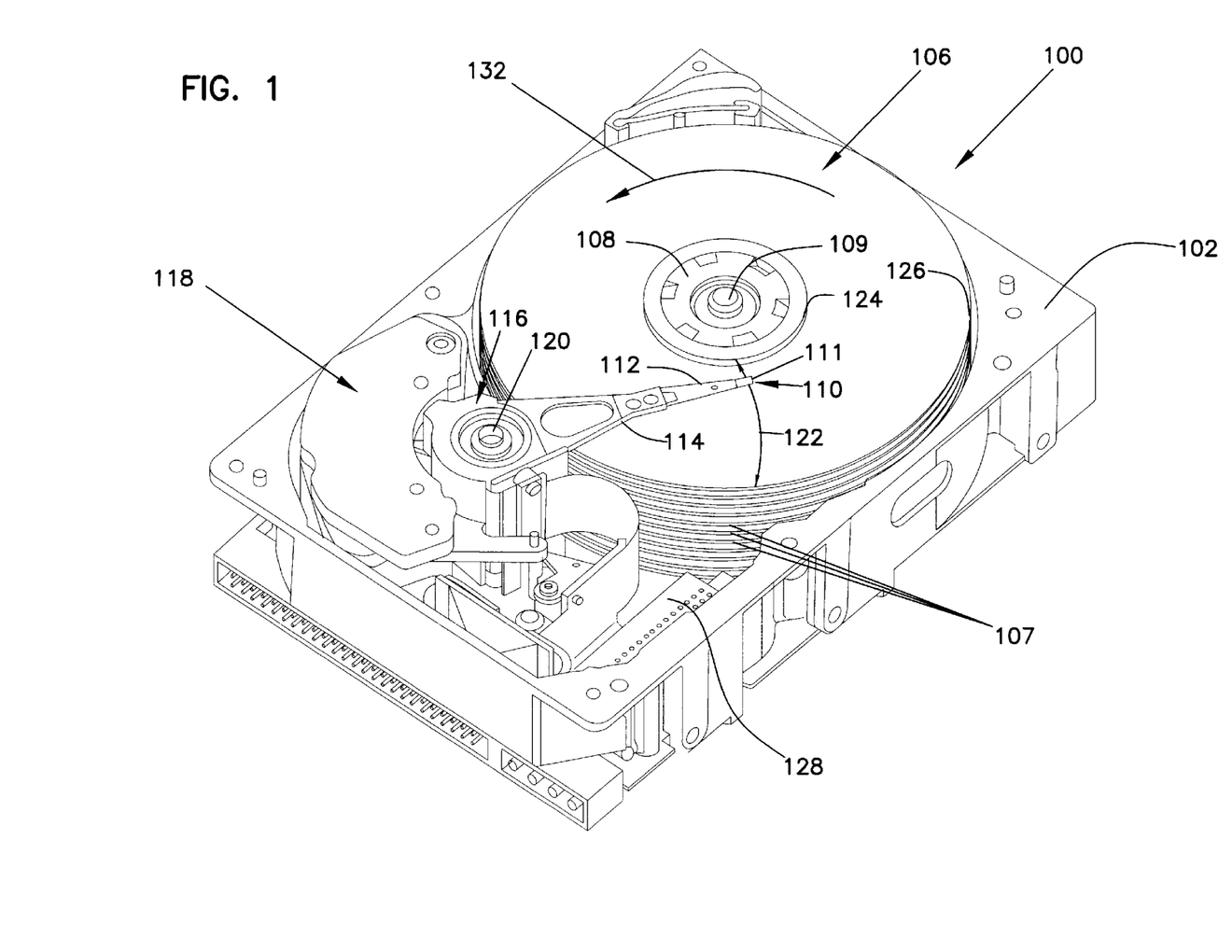
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 128 to supply signals to the host computer based on data read from disc pack 106 by the read heads of head-sliders 110, and to supply write signals to the write head of head-sliders 110 to write data to the discs.

Figure 2:
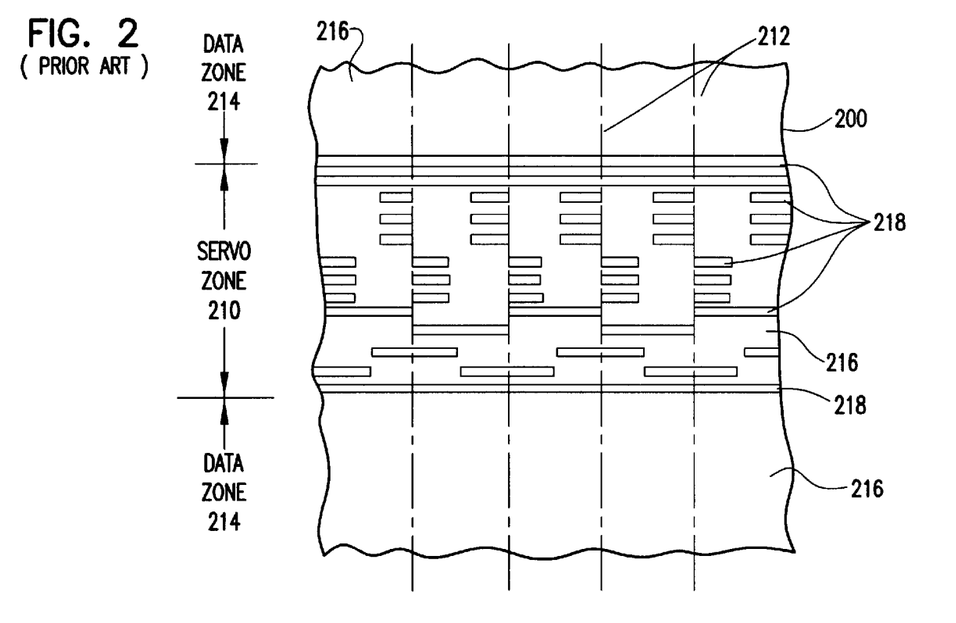
FIGS. 2 and 3 are plan views illustrating two embodiments of patterned disc media of the prior art.

FIG. 2 is a plan view of a portion of a disc medium 200 having a patterned servo sector 210 according to one form of the prior art. A plurality of concentric tracks 212 pass through the servo sector. (Although FIG. 2 illustrates the tracks as linear for sake of simplicity, those skilled in the art will recognize that tracks 212 are circular and concentric on a circular disc with the width of each track being aligned along the radius of the disc.) Servo sector 210 separates data sectors 214 containing a magnetic medium on which user data are recorded. The disc has a nominal surface 216 extending through the data sectors and servo sectors, with pits 218 in the servo sector 210 in a predetermined servo pattern. Pits 218 are typically 10 to 25 nanometers deep in surface 216. (While the prior art and the present invention will be described in connection with servo patterns having surface irregularities as depressions in the form of pits or grooves, the surface irregularities may be raised areas in the form of bumps, lands and ridges. Therefore, the present invention is not limited to surface irregularities in the form of depressions, such as pits and grooves, but instead includes surface irregularities in the form of raised areas, such as bumps, lands and ridges.) The slider, such as slider 110 in FIG. 1, aerodynamically "flies" over the nominal surface 216 along a track 212. Upon entering a servo sector 210, pits 218 collectively appear (aerodynamically) as one large "valley" extending the full length of the servo sector and full width of the slider. Typically, this valley is 20 to 80 microns in length between data sectors 214 with a depth into the disc of about 5 to 12.5 nanometers from nominal surface 216. Upon confronting the valley, the slider, trying to maintain a constant fly height from the surface of the disc, will drop in elevation; typical changes in elevation being as much as 5 to 10 nanometers. As a result, the slider experiences fly height perturbations, modulating the fly height as much as 5 to 10 nanometers.

Figure 3:
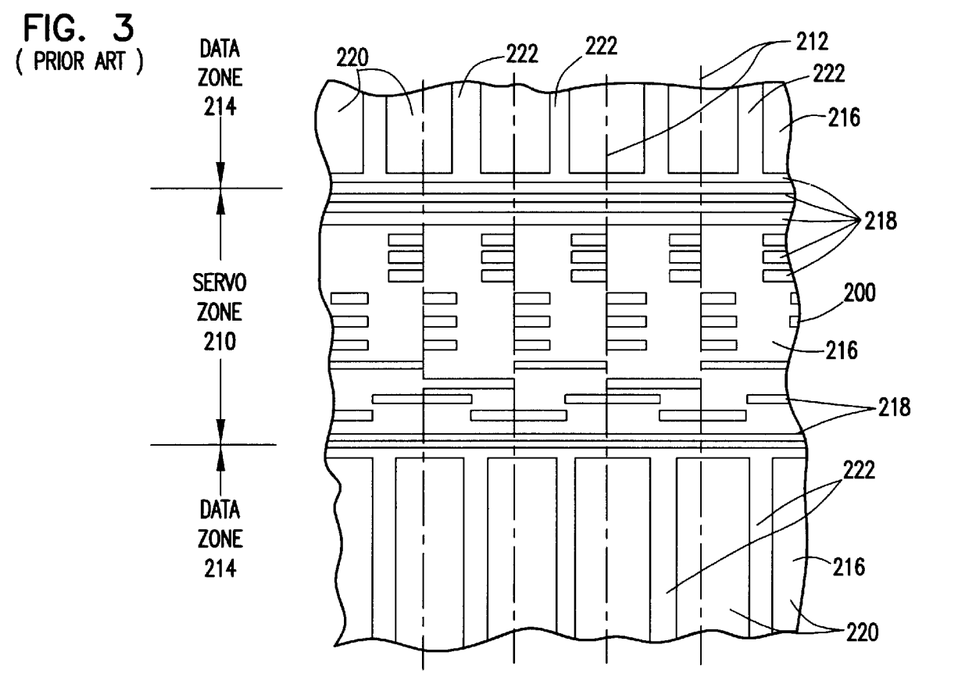

To overcome the fly height perturbations due to the disc illustrated in FIG. 2, Morita, in U.S. Pat. No. 6,088,200 proposed a patterned disc employing concentric grooves between the tracks extending through the data sectors. These grooves extended into the nominal surface and formed lands of magnetic material in which user data was recorded. The Morita approach is shown in FIG. 3 where lands 220 are separated by continuous grooves 222 extending through the data sector 214. (As in the case of FIG. 2, FIG. 3 illustrates the tracks as linear for sake of simplicity only, as the tracks are circular and concentric on a circular disc.) Morita establishes a land-to-groove ratio in the data sectors that is equal to that of the servo sector so that the slider aerodynamically "sees" the same average surface height through the servo and data sectors to thereby minimize fly height perturbations of the slider. Moreover, Morita proposed maintaining the land-to-groove ratio high for both the data and servo sectors so that slight differences in the ratios between the servo and data sectors have minimal effect on the flying characteristics of the slider.

One problem with the Morita approach was that grooves 222 extended continuously through the data zones. In theory, if the land-to-groove ratios are equal in the servo and data sectors, fly height perturbations of the slider are minimized. In practice, however, dynamic interaction between the air-bearing surface of the slider and the surface of the disc will cause non-zero fly height perturbations, even when the ratios are matched. More particularly, there are differences between the patterns of pits or bumps of the servo pattern along different tracks. Different air bearing designs of the slider react to these different patterns differently, so it is not possible to eliminate fly height perturbations simply by matching the land-to-groove ratios of the servo and data sectors. Instead, the different relationships between differing servo patterns and differing air bearing designs cause different fly height perturbations. While these different fly height perturbations can be modeled for a given disc drive having a given slider model and a given servo pattern, the resulting model of fly height perturbations can not be applied to another type of disc drive. Nevertheless, we have found that improved fly height performance can be achieved by employing non-uniform grooves (or ridges) through the data sector. In preferred embodiments, the grooves include discontinuities, in the form of radial lands. In other embodiments, the grooves are of different, or even varying depth into (or height from) the nominal surface of the disc.

Figure 4:
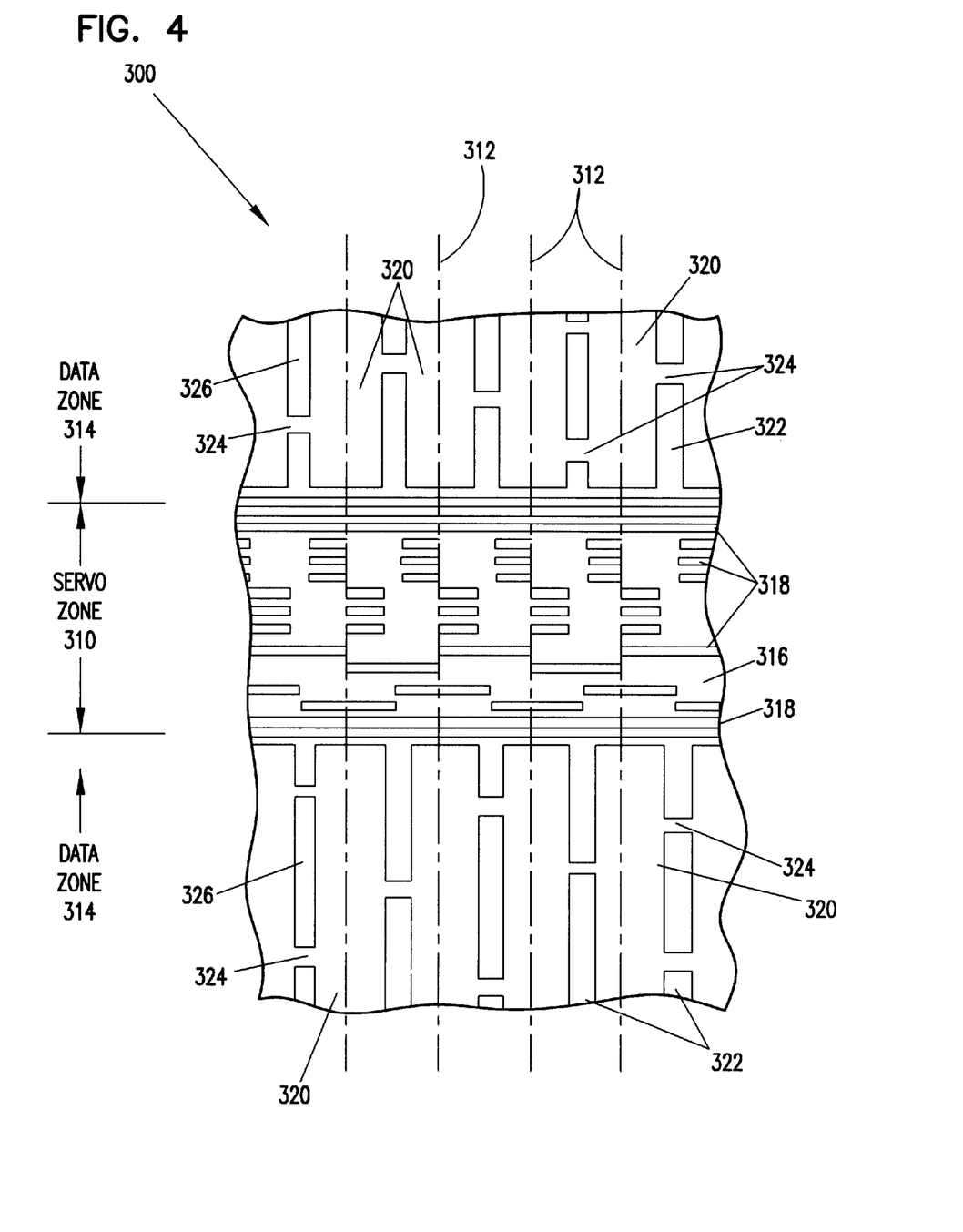
FIG. 4 is a plan view of a patterned disc media according to a first embodiment of the present invention.

One embodiment of the present invention provides a non-uniform groove and land pattern in the data sector that matches the land-groove ratio of the servo sector. The non-uniform grooves are modeled to address the perturbations due to the dynamic interaction between the slider and the disc surface. This embodiment of the patterned disc of the present invention is illustrated in FIG. 4. Disc 300 includes servo sector 310 separating data sectors 314 along tracks 312, with the servo sector containing lands 316 and pits 318, as described in connection with FIGS. 2 and 3. (As in the cases of FIGS. 2 and 3, FIG. 4 illustrates the tracks as linear for sake of simplicity, as tracks 312 are circular and concentric on a circular disc with the width of each track being aligned along the radius of the disc.) Data sector 314 includes circumferential lands 320 separated by circumferential grooves 322, as described in connection with FIG. 3, except that grooves 322 are segmented by radial lands 324 so that circumferential grooves form groove segments 326 through data sectors 314 by radial lands 324. In preferred embodiments, the ratio of the area of the lands 320 and 324 to the area of groove segments 326 within data sector 314 is substantially equal to ratio of the area of lands 316 to the area of pits 318 within servo sector 310. Also in preferred embodiments, radial lands 324 are positioned pseudo-randomly amongst grooves 322 so that the groove segments 326 are arranged pseudo-randomly with pseudo-random lengths along the tracks and along the radius of the disc.

While the orientation of radial lands 324 across the tracks are described as "pseudo-random" to achieve a land-to-groove ratio in the servo sectors that matches that of the servo sectors, grooves 322 and lands 324 are arranged in a pattern that best fits a model of zero fly height perturbations for the disc/slider combination of disc 107 (including the pattern of servo pits 318 in servo sectors 314) and slider 110 (FIG. 1). More particularly, after sliders 110, discs 107 and the configurations of pits 318 in servo sectors 314 are selected for disc drive 100, the pattern of fly height perturbations of the slider is modeled by a computer. Based on that model, groove segments 326 are arranged, or laid out, within the data sectors in a pattern designed to achieve zero or near-zero fly height perturbations in the model. The pattern of groove segments provides a land-to-groove that closely matches that of the servo sector, and is patterned in a pseudo-random pattern through the length of each data sector (along the track length) between servo sectors. Typically, the pattern of groove segments will be more ordered (less random) at and adjacent the intersection with the servo sectors. Usually the more ordered appearance will appear in the data sectors before (upstream) of the servo sectors.

Lands 324 are formed by the selective formation of groove segments 326, coupling lands 320. Hence, lands 324 have the same height at the nominal surface of medium 300 as lands 320. Preferably, groove segments 326 are formed during the same process steps as pits 318 are formed in the servo sectors, and to the same depth as pits 318.

Figure 4A:
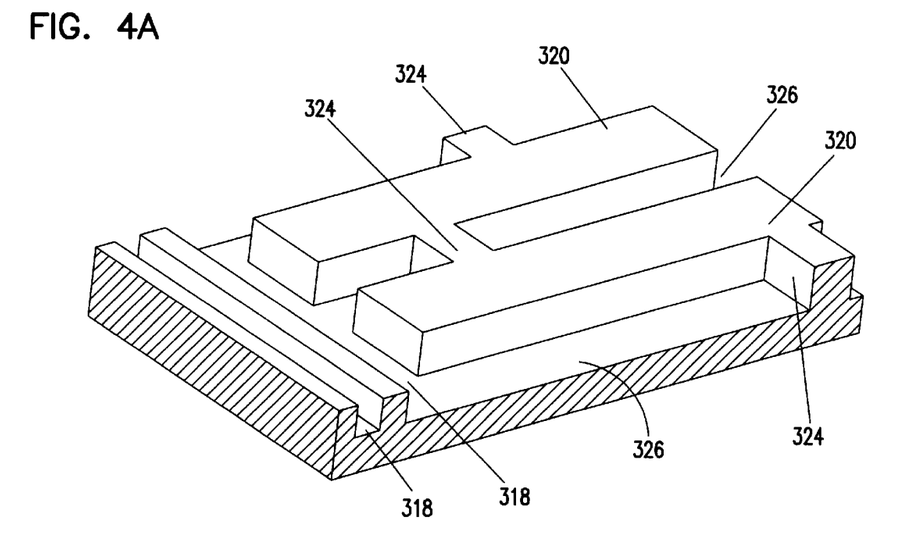
FIGS. 4A and 4B are perspective views illustrating a portion of a patterned disc media in accordance with two embodiments of the media illustrated in FIG. 4.
Figure 4B:
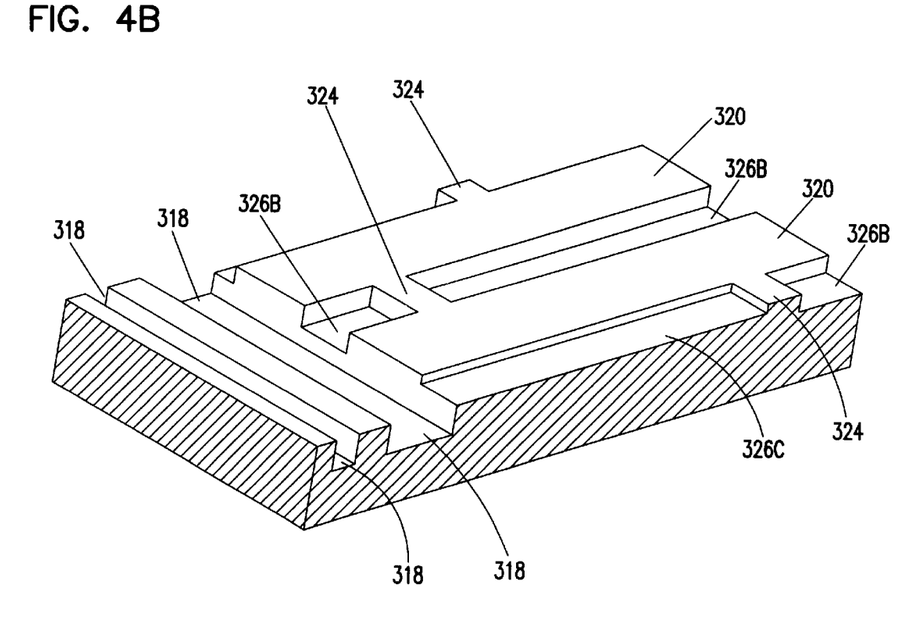

While the groove segments 326 are described as having the same depth as pits 318 in the servo sectors as shown in FIG. 4A, it might be desirable to arrange the groove segments 326B at different depths from pits 318 as shown in FIG. 4B, or even at varying depths. More particularly, in FIG. 4B the pattern of the groove segments may be achieved by arranging different groove segments 326B and 326C at different depths along the length of a data sector, or arranging different radial grooves 322 at different depths. Moreover, it is possible to employ a Continuous groove 322 with an undulating depth forming segments at varying depths to satisfy the fly height perturbation model.

While the pattern of grooves or groove segments is described as modeled to achieve zero or near-zero fly height perturbations in the computer model, it is not necessary that the model be performed for each disc/slider combination, or even for each type (model) of disc drive. Instead, the groove or groove segment pattern through the data sectors of disc may be the same for all copies of a single type (model) of disc drive that employ the same slider type, the same disc type, the same configuration of pits 318 in the servo pattern and the same rotational velocity.

Disc 107 may be manufactured in a press using a master that presses grooves 322 and/or groove segments 326 into the disc surface. Construction of the master for the pressing operation allows fabrication of the grooves and groove segments at any desired depth or varying depth. Hence, discs 107 can be mass-produced for any given type (model) of disc drive. Alternatively, the surface irregularities may be formed in situ, such as by burning depressions into the nominal surface with a laser gun or the like to define the pattern of surface irregularities. This latter technique may be particularly useful to conform an otherwise non-conforming disc to the pattern of surface irregularities in accordance with the principles of the present invention.

Figure 5:
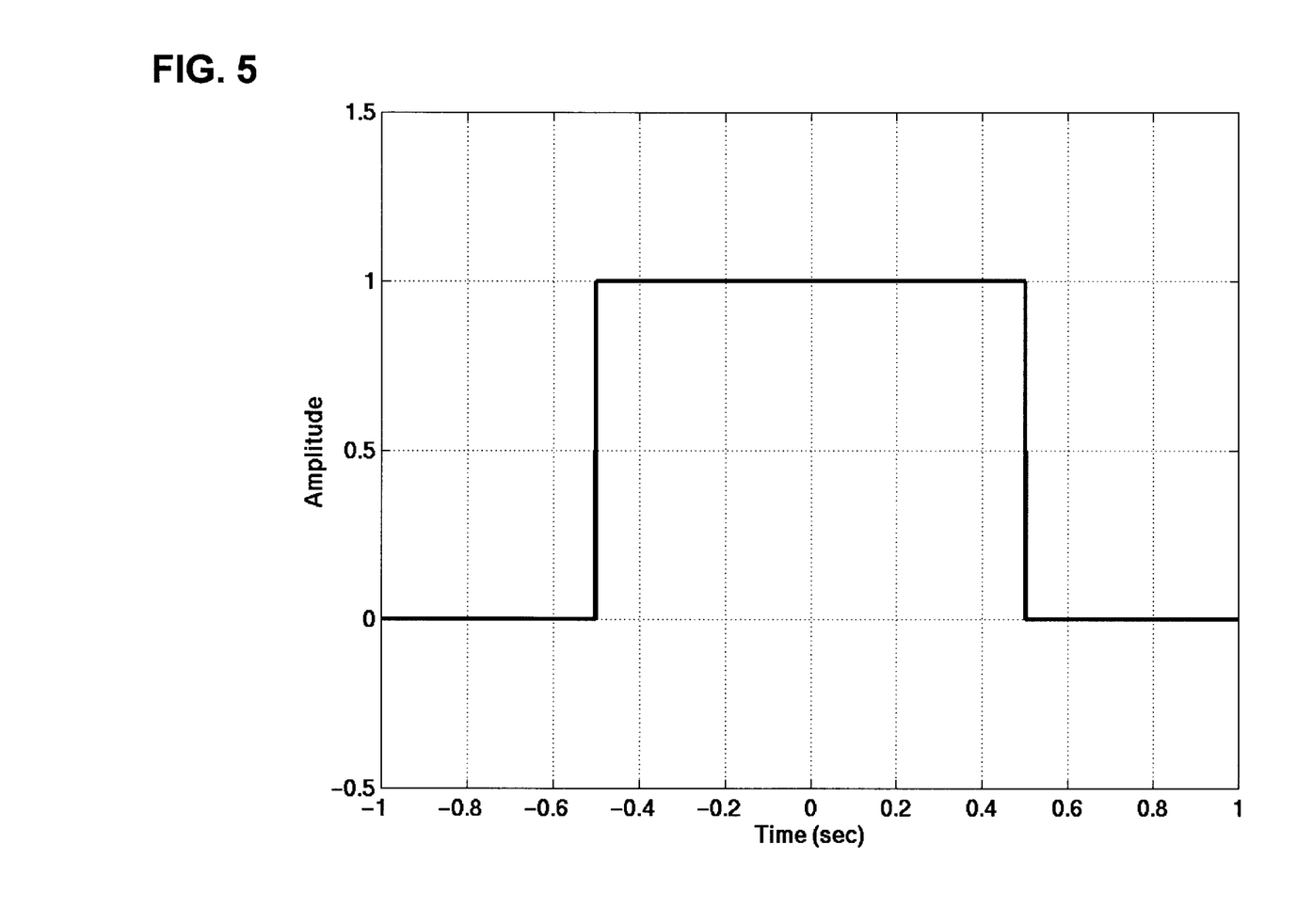
FIGS. 5 and 6 illustrate time domain and frequency domain functions of a modulating fly height pattern of a slider, useful in explaining an aspect of a second embodiment of the present invention.
Figure 6:
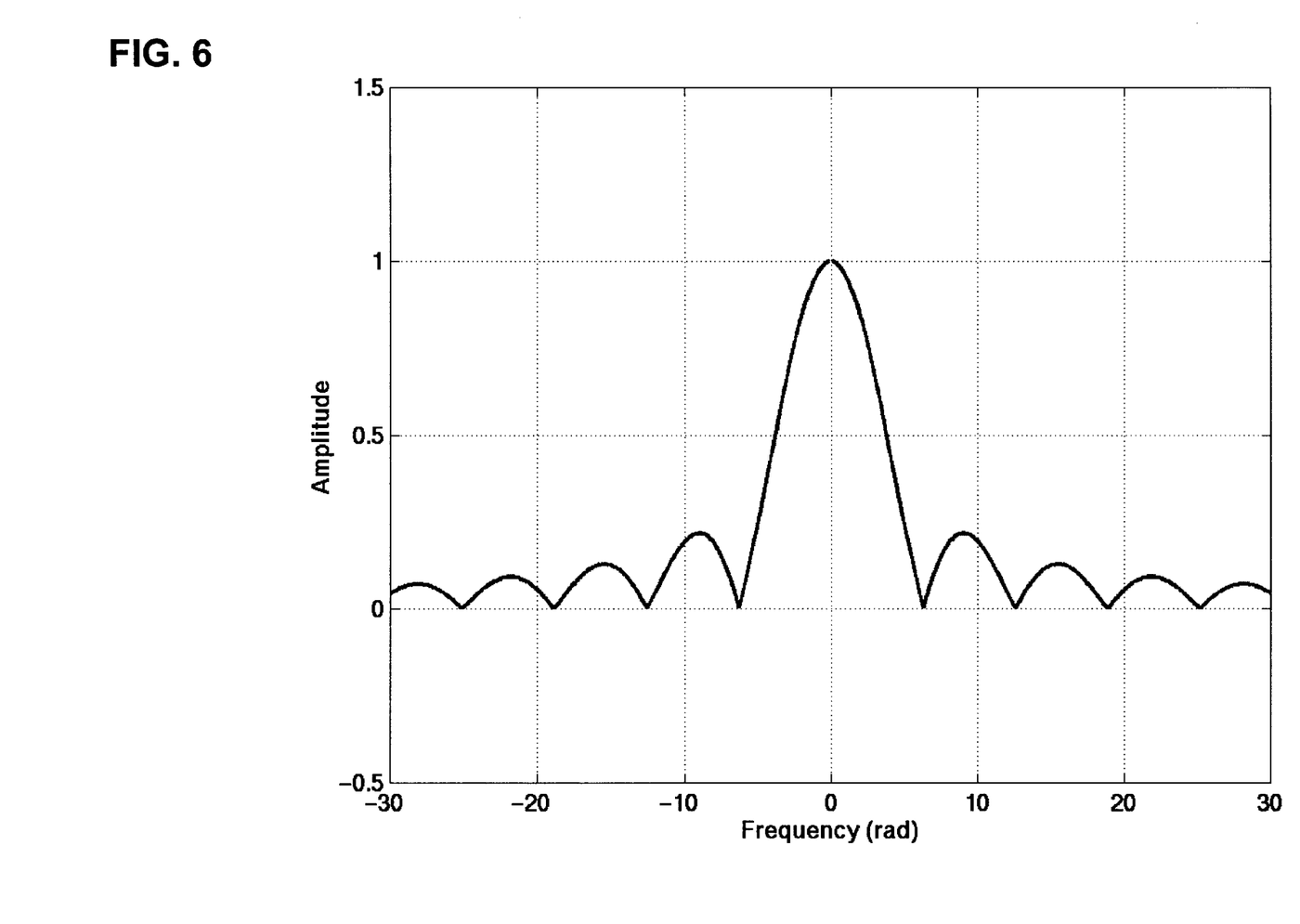
Figure 7:
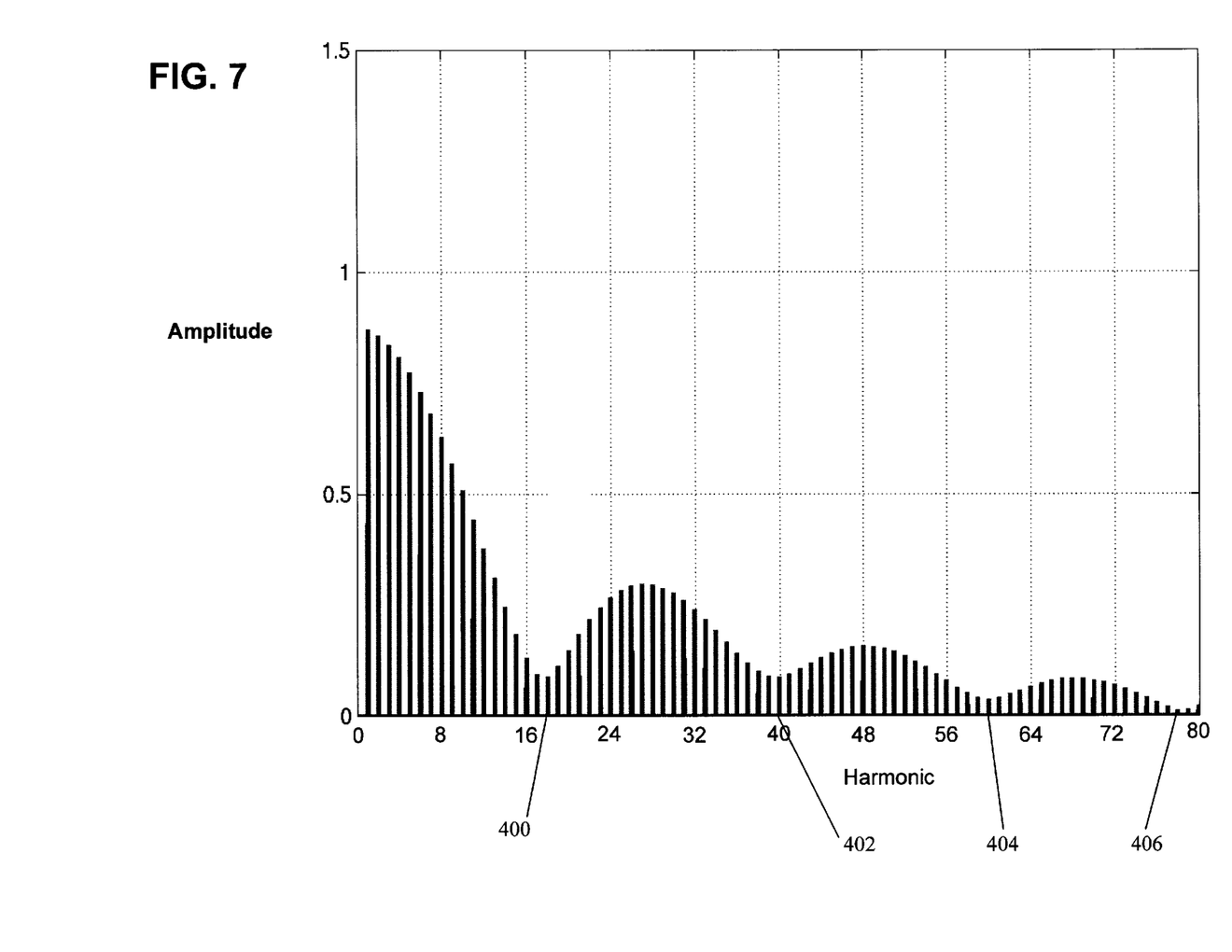
FIG. 7 illustrates frequency domain representations of servo of a disc, useful in explaining the second embodiment of the invention.

As slider 110 flies over the disc surface, the servo sector appears as a "valley" to the fly pattern of the slider. The "valley" of the servo sector modulates the fly pattern of the slider as a travelling square wave having a fundamental frequency equal to the frequency at which the servo sectors pass under the slider. The square wave can be represented in both time domain, f(t), and frequency domain, F(ω). FIGS. 5 and 6 illustrate the time domain and frequency domain Fast Fourier Transform (FFT) functions, respectively. FIG. 5 illustrates the FFT due to the servo pattern, and FIG. 6 illustrates the FFT of the entire pattern around the entire disc.

For example, the servo sectors on a disc having 120 servo sectors and rotated at 7200 revolutions per minute (rpm) will provide a fundamental frequency of about 14.4 kiloHertz (KHz). The FFT waveform of FIG. 6 identifies the average depth of the servo sectors at each of the harmonics of the fundamental frequency. The elevation of the slider modulates due to the depth of the servo sector. Slider modulation is minimal when the amplitude of a harmonic is lowest in FIG. 6. This means that slider modulation is minimal at a harmonic of the fundamental frequency representing a null, or low point in FIG. 6. An inspection of FIG. 6 reveals a null occurs (in this case) at the 18th, 40th, 60th and 78th harmonics of the fundamental frequency, representing 259.2 KHz, 576 KHz, 864 KHz and 1.123 megaHertz (MHz). The object, therefore, is to match the null frequency of the servo pattern with the pitch frequency of the trailing edge of the slider.

Currently, most sliders have a trailing edge pitch frequency between 200 and 300 KHz. Under such circumstances, the most promising null frequency is 259.2 KHz (for the example). One technique is to design the slider, geometrically, to exhibit a trailing edge pitch frequency equal to the selected null frequency of the pattern, i.e., 259.2 KHz. A more preferred technique is to alter the servo pattern null frequency to match the trailing edge pitch frequency of the slider.

The servo pattern null frequency, $F_{null}$, is based on the linear disc velocity, $v_t$, at a given track, t, and the length of the servo sector, $L_s$, along the track:

$$F_{null} = \frac{v_t}{L_s}.$$

The linear velocity in microinches per second of a given track t is $v_t = K \cdot r_t$, where $$K = \frac{2\pi V_r}{60}, V_r$$

is the rotational velocity of the disc in revolutions per minute and $r_t$ is the radius of track t in microinches. The length of a servo sector in microinches is $L_s = C \cdot r_t$, where $$C = \frac{2\pi P}{N}, N$$

is the number of servo sectors along the track and P is the percentage of the track that contains servo sectors. Consequently, $$F_{null} = \frac{N \cdot V_r}{60P}.$$

It will be appreciated by those skilled in the art that the servo and data sectors of a disc are wedge-shaped, meaning that P is constant for all values of $r_t$. P is the ratio of the length of a servo sector to the length of a track segment containing a servo sector and a data sector $$\left(P = \frac{L_s}{L_s + L_d}\right),$$

where $L_d$ is the length of a data sector. Moreover, P is constant over all radii of a disc. Consequently, $$F_{null} \propto \frac{V_r}{\frac{L_s}{(L_s + L_d)}}. \quad \text{Eq. 1}$$

From Equation 1, it is evident that the null frequency of the servo sector can be adjusted by changing either the rotational velocity of the disc, or by changing the ratio of the length of the servo sector to the combined length of the servo and data sectors, or both. Since increasing the servo sector length decreases the data sector length and vice versa, the null frequency, $F_{null}$, of the servo sector can be adjusted by adjusting the rotational velocity of the disc or the length of the servo sector. We prefer to alter the servo sector length along the track to avoid affecting modal parameters of the slider due to changing rotational (and hence, linear) velocity.

The length of servo sectors 310 along the track is defined by identifying the trailing edge pitch frequency of slider 110. Typically, the trailing edge pitch frequency of the slider is identified experimentally for a given design of slider. Consequently, for a given model of production disc drives, the trailing edge pitch frequency of the slider to be used in the disc drive is identified for all copies of that model of drive. The null frequency of the servo sectors on Equation 1 is set equal to the trailing edge pitch frequency of the slider, and the length of the servo sector along the tracks is calculated and set, based on a solution to Equation 1. In the general sense, the length of the servo sector along the track is derived from $$F_{null} = \frac{v_t}{L_s}.$$

In the specific application to rotating disc drives, the length of the servo sector is derived from $$F_{null} = \frac{N}{60} \cdot \frac{V_r}{\frac{L_s}{(L_s + L_d)}}.$$

Computer simulations on the pattern spectral tuning were performed by varying disc velocity so that the pattern null frequency (Equation 1) varied through the known trailing edge pitch frequency of the slider. The simulation modeled a significant drop-off in the amplitude of modulation of the slider when the pattern null frequency approximately matched the trailing edge pitch frequency of the slider. We also found that the pattern null frequency need not exactly match the trailing edge pitch frequency. Instead, we found satisfactory results when the pattern null frequency was within ±15% of the nominal trailing edge pitch frequency of the slider.

Stated another way, one embodiment of storage medium (300) includes a plurality of data sectors (314) separated by respective servo sectors (310) and a plurality of parallel tracks (312) extending through the servo sectors and data sectors. Each servo sector (310) has a pattern of first surface irregularities (318) along each track representing servo data. A second surface irregularity (322) in each data sector separates adjacent tracks (312), with each first and second surface irregularity (322 and 318) having an elevation different from a nominal surface (316) of the medium. Non-uniform means (324) pattern the second surface irregularities (322) to a model of fly height perturbations of a slider (110) adjacent the medium.

In preferred forms of this embodiment, the non-uniform means comprises third surface irregularities (324) pseudo-randomly spaced along each second surface irregularity (322) to form segments (326) of pseudo-random length. Preferably, third surface irregularities (324) are pseudo-randomly positioned across the data sector (314).

In another embodiment, storage medium (300) includes a plurality of data sectors (314) separated by respective servo sectors (310) and a plurality of parallel tracks (312) extending through the servo sectors and data sectors. Each servo sector (310) has a pattern of surface irregularities (318) along each track representing servo data. Storage medium (300) is arranged to move at a predetermined velocity relative to slider (110) to cause the slider to fly along a track (312) over the data sectors (314) and servo sectors (310). The servo sectors have a length ($L_s$) along each track to define a null frequency ($F_{null}$) that matches a pitch frequency of modulation of the slider (110) due to the surface irregularities (318) of the servo sectors (310).

In another embodiment, a patterned storage medium (300) is fabricated by forming first surface irregularities (318) to an elevation different from a nominal surface (316) of the medium to define servo sectors (310) separating data sectors (314) on the medium. A plurality of tracks (312) are defined through data sectors and servo sectors. A plurality of second surface irregularities (322) parallel to each track (312) are defined through the data sectors. A plurality of third surface irregularities (324) is arranged so that a slider (110) adjacent the medium (300) exhibits a model of minimum fly height perturbations when the slider moves at a selected velocity along the tracks (312).

In yet another embodiment, a patterned storage medium (300) is fabricated by forming surface irregularities (318) to an elevation different from a nominal surface (316) of the medium to define servo sectors (310) separating data sectors (314) on the medium. A plurality of tracks (312) are defined through data sectors and servo sectors. A length ($L_s$) of each servo sector is defined along each track to minimize modulation of an aerodynamic slider (110) arranged to fly adjacent the medium (300).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the patterns while maintaining substantially the same functionality without departing from the scope and spirit of the present invention. Thus, while the invention has been described as in terms of patterns of pits in the form of depressions into the nominal surface of the medium, the invention may instead be implemented as bumps in the form of rises from the nominal surface of the medium, as well as in a combination of both. In addition, although the preferred embodiment described herein is directed to a patterning a disc medium for a magnetic disc drive system, it will be appreciated by those skilled in the art that the teachings of the present invention can be applied to other systems, like optical drive systems, systems employing optical reading of the pits, and other systems employing two classes of data, without departing from the scope and spirit of the present invention. While the preferred embodiments described herein is directed to a storage medium that is pre-patterned, such as by a press or the like, the teachings of the present invention may also be employed to pattern a medium in situ, such as by directing a laser beam to the medium after assembly of the drive to form or alter a pattern of pits in the medium that establish minimum fly height perturbations. Moreover, if such pits are formed during a formatting stage, the servo patterns may be formed in the servo sectors at the same time, and the length of the servo sectors may be established as described herein, without departing from the scope and spirit of the present invention.

What is claimed is:

1. A storage medium having a plurality of data sectors separated by respective servo sectors and a plurality of substantially parallel tracks extending through the servo sectors and data sectors, the medium including:
   a pattern of first surface irregularities representing servo data in the servo sectors;
   second surface irregularities in each data sector arranged to separate adjacent tracks, the first and second surface irregularities having elevations different from a nominal surface of the medium; and
   third surface irregularities in the second surface irregularities, the third surface irregularities having elevations different from the second surface irregularities.

2. The storage medium of claim 1, wherein the third surface irregularities are pseudo-randomly spaced along each second surface irregularity to form segments of pseudo-random length.

3. The storage medium of claim 2, wherein the third surface irregularities are pseudo-randomly positioned across the data sector.

4. The storage medium of claim 1, wherein a surface of at least one of the second surface irregularities has an elevation that is different from a corresponding surface of another of the second surface irregularities.

5. The storage medium of claim 1, wherein the servo sectors have lengths along the tracks so disposed and arranged to minimize modulation of an aerodynamic slider arranged to fly adjacent the medium.

6. The storage medium of claim 5, wherein the storage medium is arranged to move at a predetermined velocity relative to the slider to cause the slider to fly along a track over the data sectors and servo sectors, the lengths of the servo sectors along the tracks being so disposed and arranged to define a null frequency when the medium moves at the predetermined velocity based on a pitch frequency of modulation of the slider due to the first surface irregularities of the servo sectors.

7. The storage medium of claim 6, wherein the length, $L_s$, of the servo sector along each track is based on the relationship $$L_s = \frac{v_t}{F_{null}},$$

where $v_t$ is a velocity of the medium and $F_{null}$ is the pitch frequency of the slider.

8. A storage medium having a plurality of data sectors separated by respective servo sectors and a plurality of substantially parallel tracks extending through the servo sectors and data sectors, wherein the storage medium is arranged to move at a predetermined velocity relative to a slider to cause the slider to fly along a track over the data sectors and servo sectors, the slider having a pitch frequency of modulation due to surface irregularities in the medium when the medium moves at the predetermined velocity, the medium including:
   a pattern of surface irregularities in the servo sectors representing servo data; and
   an arrangement of the tracks such that the servo sectors have a length along the tracks defining a null frequency that is within 15% of the pitch frequency.

9. The storage medium of claim 8, wherein the length, $L_s$, of the servo sector along each track is based on the relationship $$L_s = v_t / F_{null},$$

where $v_t$ is a velocity of the medium and $F_{null}$ is the pitch frequency of the slider.

10. The storage medium of claim 8, wherein the medium is a rotating disc containing concentric tracks, the length, $L_s$, of the servo sector along each track is based on the relationship $$F_{null} \propto \frac{V_r}{L_s/(L_s + L_d)},$$

where $V_r$ is a rotational velocity of the disc, $L_d$ is a length of a data sector along the track and $F_{null}$ is the pitch frequency of the slider.

11. A process of fabricating a patterned storage medium comprising steps of:
   a) forming first surface irregularities at an elevation different from a nominal surface of the storage medium to define servo patterns in servo sectors separating data sectors on the medium;
   b) defining a plurality of substantially parallel tracks through data sectors and servo sectors;
   c) defining a plurality of second surface irregularities between adjacent tracks substantially parallel to each track through the data sectors at an elevation different from the nominal surface, d) defining a plurality of third surface irregularities in the second irregularities at an elevation different from the second surface irregularities, and e) fabricating the medium so that the surface irregularities are so disposed and arranged that a slider adjacent the medium exhibits minimum fly height perturbations when the slider is moved at a selected velocity along the tracks.

12. The process of claim 11, wherein step (d) includes a step of:

Pseudo-randomly spacing the third surface irregularities along each second surface irregularity to form segments of the second surface irregularities having pseudo-random length.

13. The process of claim 12, wherein step (d) includes a step of:

pseudo-randomly positioning the third surface irregularities across the data sector.

14. The process of claim 11, wherein step (c) includes steps of:

defining a surface of at least one of the second surface irregularities at an elevation that is different from the elevation of the nominal surface, and defining a surface of at least a second of the second surface irregularities at an elevation that is different from the elevations of both the nominal surface and the at least one of the second surface irregularities.

15. The process of claim 11, further including a step of:

f) defining a length of each servo sector along each track to minimize modulation of an aerodynamic slider arranged to fly adjacent the medium.

16. The process of claim 15, wherein the storage medium is constructed to move at the predetermined velocity relative to the slider to cause the slider to fly along a track over the data sectors and servo sectors, and step (f) includes:

f1) identifying a pitch frequency of modulation of the slider due to the first surface irregularities of the servo sector, and f2) defining a length of each servo sector along each track to define a null frequency based on the pitch frequency.

17. The process of claim 16, wherein step (f2) defines the length, $L_s$, of the servo sectors along each track based on the relationship $$L_s = v_t / F_{null},$$

where $v_t$ is a velocity of the medium and $F_{null}$ is the pitch frequency of the slider.

18. A process of fabricating a patterned storage medium constructed to move at a predetermined velocity relative to an aerodynamic slider to cause the slider to fly over the medium along a track, the process comprising steps of:

a) forming surface irregularities in servo sectors that separate data sectors on the medium, the surface irregularities being at an elevation different from a nominal surface of the storage medium;

b) defining a plurality of tracks through the data sectors and servo sectors;

c) identifying a pitch frequency of modulation of the slider due to the surface irregularities of a servo sector; and d) defining a length of each servo sector along each track to define a null frequency that is within 15% of the pitch frequency to minimize modulation the of slider.

19. The process of claim 18, wherein step (d) defines the length, $L_s$, of the servo sectors along each track based on the relationship $$L_s = v_t / F_{null},$$

where $v_t$ is a velocity of the medium and $F_{null}$ is the pitch frequency of the slider.

* * * * *